(12) United States Patent
Mao

(10) Patent No.: US 7,376,897 B1
(45) Date of Patent: May 20, 2008

(54) METHOD, APPARATUS, AND SYSTEM FOR DETERMINING INFORMATION REPRESENTATIONS AND MODALITIES BASED ON USER PREFERENCES AND RESOURCE CONSUMPTION

(75) Inventor: Xiaodong Mao, Foster City, CA (US)

(73) Assignee: Intel Corporation, Santa Clara, CA (US)

( * ) Notice: Subject to any disclaimer, the term of this patent is extended or adjusted under 35 U.S.C. 154(b) by 811 days.

(21) Appl. No.: 10/148,857

(22) PCT Filed: Sep. 30, 2000

(86) PCT No.: PCT/CN00/00301

§ 371 (c)(1),
(2), (4) Date: Apr. 8, 2003

(87) PCT Pub. No.: WO02/29603

PCT Pub. Date: Apr. 11, 2002

(51) Int. Cl.
G06F 17/00 (2006.01)
(52) U.S. Cl. .................... 715/714; 715/747; 715/708; 715/765
(58) Field of Classification Search ............... 715/700, 715/526, 866, 708, 714, 736–747, 765
See application file for complete search history.

(56) References Cited

U.S. PATENT DOCUMENTS

| 5,021,976 | A | | 6/1991 | Wexelblat et al. | |
|---|---|---|---|---|---|
| 5,732,368 | A | * | 3/1998 | Knoll et al. | 701/1 |
| 5,748,186 | A | * | 5/1998 | Raman | 715/500.1 |
| 5,812,865 | A | * | 9/1998 | Theimer et al. | 709/228 |
| 5,835,768 | A | * | 11/1998 | Miller et al. | 719/320 |
| 5,845,303 | A | * | 12/1998 | Templeman | 715/517 |
| 5,878,274 | A | * | 3/1999 | Kono et al. | 710/8 |
| 5,918,222 | A | * | 6/1999 | Fukui et al. | 707/1 |
| 6,014,638 | A | * | 1/2000 | Burge et al. | 705/27 |
| 6,064,943 | A | * | 5/2000 | Clark et al. | 702/2 |
| 6,105,063 | A | * | 8/2000 | Hayes, Jr. | 709/223 |
| 6,199,080 | B1 | * | 3/2001 | Nielsen | 715/513 |
| 6,236,990 | B1 | * | 5/2001 | Geller et al. | 707/5 |
| 6,249,290 | B1 | * | 6/2001 | Herndon et al. | 345/660 |
| 6,275,227 | B1 | * | 8/2001 | DeStefano | 369/30.01 |

(Continued)

OTHER PUBLICATIONS

Search Report for PCT/CN00/00301; mailed Sep. 27, 2001; 1 page.

*Primary Examiner*—Tadesse Hailu
(74) *Attorney, Agent, or Firm*—Blakely, Sokoloff, Taylor & Zafman LLP

(57) ABSTRACT

According to one aspect of the invention, a method is provided in which a user in a system is allowed to specify a relative preference for each representation in a set of representations in which information generated from an application domain can be presented to the user. The user is allowed to configure one or more parameters associated with each representation to quantify one or more rendering features corresponding to the respective representation in one or more modalities in which information from the application domain can be presented to the user. In response to an information presentation request to present information to the user, one or more combinations of representations and modalities are selected to be used for the presentation request that can be accommodated by available resources, based upon a set of criteria including the user preferences and resource consumption estimation associated with the presentation request.

6 Claims, 3 Drawing Sheets

U.S. PATENT DOCUMENTS

| | | | |
|---|---|---|---|
| 6,401,094 B1 * | 6/2002 | Stemp et al. | 707/10 |
| 6,466,232 B1 * | 10/2002 | Newell et al. | 715/700 |
| 6,498,955 B1 * | 12/2002 | McCarthy et al. | 700/1 |
| 6,502,000 B1 * | 12/2002 | Arnold et al. | 700/83 |
| 6,556,217 B1 * | 4/2003 | Makipaa et al. | 345/667 |
| 6,564,263 B1 * | 5/2003 | Bergman et al. | 709/231 |
| 6,580,438 B1 * | 6/2003 | Ichimura et al. | 715/732 |
| 6,593,943 B1 * | 7/2003 | MacPhail | 715/734 |
| 6,717,589 B1 * | 4/2004 | Grillo et al. | 715/715 |
| 6,745,163 B1 * | 6/2004 | Brocious et al. | 704/260 |
| 6,781,609 B1 * | 8/2004 | Barker et al. | 715/760 |
| 6,826,552 B1 * | 11/2004 | Grosser et al. | 706/47 |
| 6,859,451 B1 * | 2/2005 | Pasternack et al. | 370/352 |
| 7,058,905 B2 * | 6/2006 | Guerrero | 715/853 |
| 7,107,063 B1 * | 9/2006 | Bates et al. | 455/456.1 |
| 7,137,119 B1 * | 11/2006 | Sankaranarayan et al. | 718/103 |
| 2002/0066033 A1 * | 5/2002 | Dobbins et al. | 713/201 |
| 2003/0118323 A1 * | 6/2003 | Ismail et al. | 386/83 |
| 2004/0143636 A1 * | 7/2004 | Horvitz et al. | 709/207 |
| 2005/0012755 A1 * | 1/2005 | Dresevic et al. | 345/581 |

* cited by examiner

METHOD, APPARATUS, AND SYSTEM FOR DETERMINING INFORMATION REPRESENTATIONS AND MODALITIES BASED ON USER PREFERENCES AND RESOURCE CONSUMPTION

FIELD OF THE INVENTION

The present invention relates to the field of multimodal human-computer interaction and interface. More specifically, the present invention relates to a method, apparatus, and system for determining information representations and modalities based on user preferences and resource consumption requirements.

BACKGROUND OF THE INVENTION

The field of human-computer interaction and interface has been undergoing rapid changes in recent years due to advances in computer technology and related fields. In particular, a lot of time and effort has been directed to utilizing technological advances in multimedia and multimodal processing to improve the usability and productivity of processing systems. Multimedia systems have been developed and improved at a rapid pace to provide the users with more and more options and flexibility in their interface with the systems, for both input and output applications. However, current multimedia systems still have a number of shortcomings in their approach to using multimedia capabilities available to present information in various output modalities. Current multimedia systems typically predefine or prescribe the modality and representation for presenting any given output information in a fixed or predetermined manner. For example, a word processing application may be configured to always present output information to the users in text format on the display screen or a company announcement system may be designed to always present company announcements as audio output, etc. Even when a system or an application is designed to present certain information simultaneously in multiple modalities (e.g., both visually and aurally), such a system or application typically cannot determine whether such a multi-modal presentation of information (e.g., both visually and aurally) in certain situations is desirable or even acceptable from a user's point of view. For example, assuming that a company announcement system is designed and configured to always present company announcements both visually (as text on display screen) and aurally (as audio output on speakers attached to the user's computer), such an inflexible selection of output modality (or modalities) may not be desirable or acceptable to certain users in certain situations. For example, a user A who currently is listening to music or having a conference call may not want to hear a company announcement as audio output on the speakers. In this case, user A may just want to see the display of the company announcement on the computer screen. Similarly, a user B who is working on a word document and already having a number of windows open on his computer screen may not want to see his screen to be cluttered with any more text but rather may only want to hear the company announcement as audio output. In other words, for any given system and/or application, rigid or inflexible designation of information to any particular (output) modality may not be desirable and even unacceptable to certain users in certain circumstances or situations. Too much information presented in any given output modality may lead to information overload with respect to a user's sensory and mental capacity to absorb information. In addition, certain users may not be able to even receive or interpret information in certain modalities. For example, audio output may not be acceptable for users with hearing impairments. Likewise, visual output (e.g., text, graphics, video, etc.) is not acceptable to users who are blind. In addition to the shortcomings mentioned above, current multimodal and multimedia systems also lack capabilities to effectively and efficiently support multiple representations of information in a multimodal environment. For example, output information from a given application may be represented in different forms or formats. However, current systems and applications are unable to determine which representation(s) of information may be better or more preferable from a user's point of view under certain circumstances. Even when an application is designed to provide and support alternative representations of information, assignment or selection of a particular type of representation is typically predetermined or requires a user to manually intervene or specify the particular representation that is suitable for that particular user at a particular moment in time. For example, a typical file management system may allow the users to view their file listing either as a summary listing (e.g., a listing of file names only), a detailed listing (e.g., a listing of file names with additional file information such as the file types, the file sizes, etc.), a list of small icons, or a list of large icons, etc. However, a user is typically required to specify or select a particular type of listing (representation of file information) that he wants to use at any given moment. Similarly, even when the systems and applications support multiple window sizes and positions for visual display, the size (and the position) of the window for any given information is either predetermined by the system or application, or the user is required to manually select or specify the desirable size (and the position). For example, when a user brings up multiple applications, the information generated from the multiple applications are either displayed in all large windows or all small windows in fixed positions, or in a fixed overlapping manner without taking into considerations the user's preferences or needs and the changes in the system's conditions and environment.

BRIEF DESCRIPTION OF THE DRAWINGS

The features and advantages of the present invention will be more fully understood by reference to the accompanying drawings, in which.

DETAILED DESCRIPTION

Figure 1:
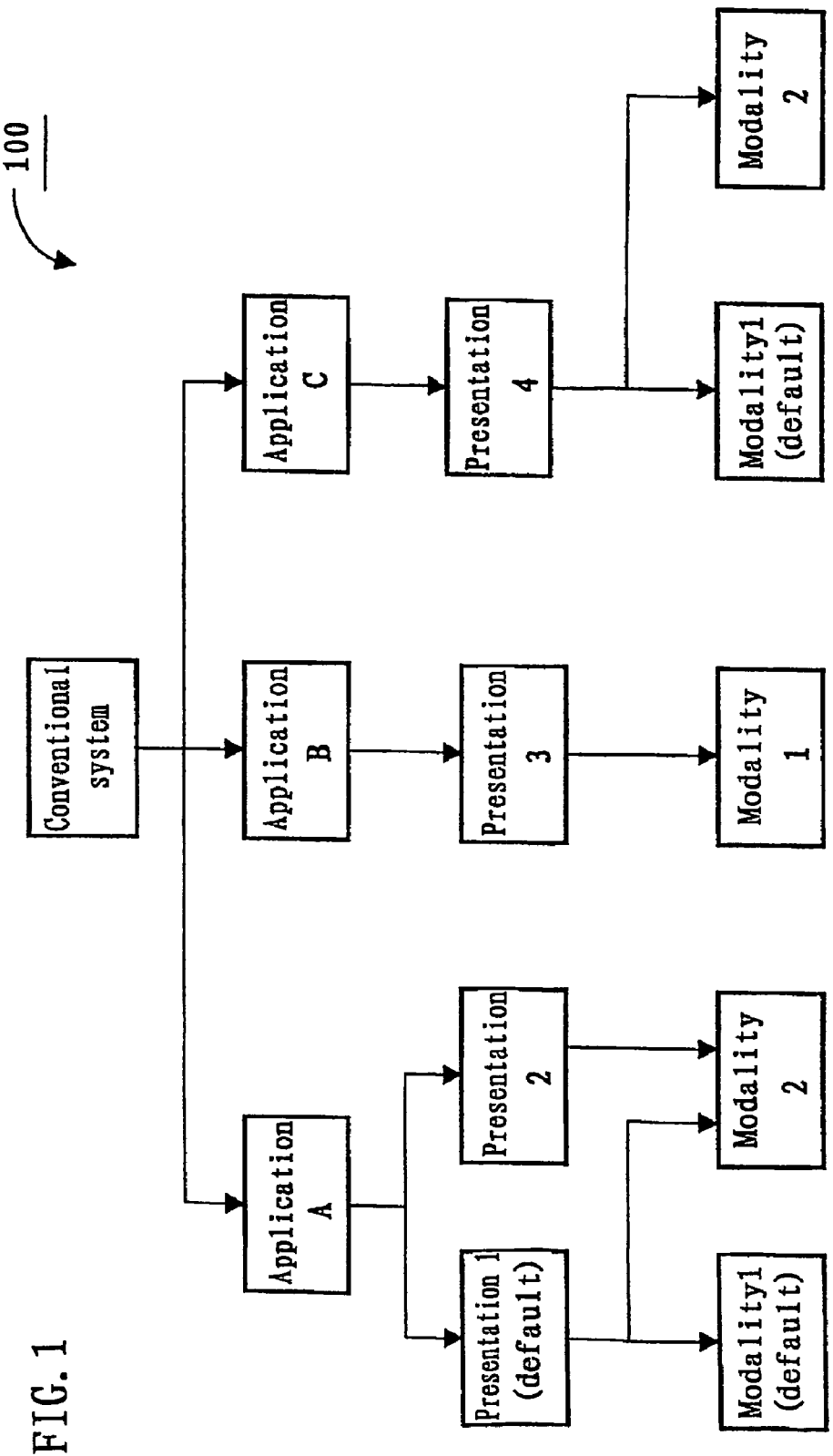
FIG. 1 is a diagram showing a traditional multimedia/multimodal configuration.

In the following detailed description numerous specific details are set forth in order to provide a thorough understanding of the present invention. However, it will be appreciated by one skilled in the art that the present invention may be understood and practiced without these specific details.

In the discussion below, the teachings of the present invention are utilized to implement a method, apparatus, system, and machine-readable medium for managing information representation in a multimodal environment. In particular, the teachings of the present invention are utilized to implement a decision making process for selecting desirable combinations of information representations and modalities for presenting information to the users, based upon their representational and/or modal preferences. In one embodiment, a user in the system is allowed to specify a relative preference for each representation in a set of available representations in which information from a particular application domain can be presented to the user. In one embodiment, the user is also allowed to specify a relative preference for each modality in which information from the particular application domain can be presented to the user. In one embodiment, the user is allowed to configured one or more parameters associated with each representation to quantify one or more rendering features of the respective representation with respect to one or more modalities in which information from the particular application domain can be presented to the user. In response to a new information presentation request to present information to the user, one or more combinations of representations and modalities are to be selected for the new presentation request that can be accommodated by available resources, based upon a set of criteria including the user representational and modal preferences and resource consumption estimation for the new presentation request. In one embodiment, the selection of the one or more combinations that can be accommodated by available resources includes determining whether available resources are sufficient for a particular combination of representation and modality, starting with the combination that is considered most preferable by the user until available resources are sufficient to accommodate at least one combination of representation and modality or until all combinations have been exhausted. In one embodiment, a list of rendering representatives is maintained which is used to determine the amount of available resources. Each rendering representative corresponds to a previously commenced presentation request. In one embodiment, the one or more modalities include visual modality and aural modality. In one embodiment, the user representational and modal preferences are stored in a first database. The parameters associated with each representation are also stored in the first database. In one embodiment, the list of rendering representatives is stored in a second database. The teachings of the present invention are applicable to any scheme, method and system for information presentation and representation in a multimodal environment which includes visual and aural modalities. However, the present invention is not limited to visual and aural modalities and can be applied to methods, schemes, and systems for information presentation and representation in other modalities as well. Likewise, while the discussion herein is focused on output modalities of information presentation and representation for illustration and explanation purposes, the teachings of the present invention are also applicable to input modalities.

FIG. 1 shows a block diagram of a conventional or traditional multimedia/multimodal system 100 that prescribes or predefines the modality and representation in which any given output information is presented to the users in a fixed or predetermined manner. As shown in FIG. 1, each application is designed to convey output information in a predetermined manner with respect to the modality and the representation in which information can be presented. While an application may be capable of presenting or conveying information in multiple representations and/or multiple modalities, the modality and representation for conveying any given information are typically predetermined and can only change with the user's manual intervention or reconfiguration. In addition, the selection of a particular modality and a particular representation for presenting or conveying information is made without considering individual user's representational and modal preferences and without considering changes in the system's conditions and environment. For example, application A, by default, would always present output information using the representation 1 in modality 1 even though representation 2 in modality may be much better and more desirable for certain users under certain circumstances. Furthermore, the rendering parameters associated with each representation and each modality are also fixed or predetermined which may not be preferable or acceptable to certain users under certain conditions. For example, assuming that representation 1 is an icon representation, it will be displayed, by default, in the same size (predetermined) at the same position (predetermined) regardless of how much other information are being displayed on the same screen at that point in time. Such a fixed rendering of representation 1 in modality 1 may be undesirable or unacceptable to a given user under certain circumstances.

The following example is provided to illustrate and explain the various aspects of the present invention. Consider a simple example of a "Calendar" application a good implementation of which will need to support multiple representations or alternative displays. In one embodiment, the various representations or displays may include the following:

1. Bit representation: a minimalist image showing whether or not any appointments are scheduled for the remainder of the day. For example, an image of "open book" in this Bit representation indicates that one or more appointments still need to be attended to.
2. Icon representation: a small image showing just the time of the next appointment.
3. Brief representation: a 2-3 line reminder concerning the next schedule appointment, giving some level of details.
4. Daily representation: a list of the day's appointments and their times, each one references a corresponding brief representation.
5. Daily-In-Brief representation: an iconic summary of the day's appointments and their times.
6. Weekly representation.
7. Monthly representation.
8. Annual representation.

In one embodiment, a list L may be used to pack all available representations for calendar as follows:

L=<Bit, Icon, Brief, Daily, Daily-In-Brief, Weekly, Monthly, Annual>.

Which representation(s) for a calendar should a system display or present to the users, given multiple representations in which information associated with the calendar application can be presented to the users? The answer to this question may depend upon the types of users and the giving time as well. For example, a busy executive might prefer the daily version, while his secretary might want the weekly or monthly instead. An engineer might want to clear most of the display screen for a detailed visualization, and to allocate just minimal space for the icon representation, etc.

These varied requirements or preferences by different users may be accommodated by expanding the List L shown above to include a relative "priority index" or "preference index" (also called preference score) for each representation. The priority index or preference score for each representation may be preset by the user in a user preference database, which is described in more detail below. Assuming that the executive has specified a priority index or preference score for each representation of the calendar, the expanded and improved list L for the executive may look like the following:

L=<(Bit, 10), (Icon, 10), (Brief, 1), (Daily, 0), (Daily-In-Brief, 3), (Weekly, 2), (Monthly, 4), (Annual, 10)>

In the present example, it is assumed that a lower priority index or preference index corresponds to a higher degree of preference (e.g., a representation with a priority index of "1" is considered more preferable or more desirable than a representation with a priority index of "3", etc.). Of course, the priority index or preference index can be defined so that a higher priority index corresponds to a higher degree of preference. In the present example, the preferred representations have lower index values. Accordingly, the assumption in above example is that the executive would be most interested in seeing the daily representation whose corresponding priority index is 0 and would be much less interested in seeing the "Bit", "Icon", and "Annual" representations whose corresponding priority index is 10.

The list L may then be reordered or sorted in a specified order. In the present example, the list L is sorted by priority index values in ascending order. The sorted list L in ascending order of the priority index values will be as follows:

L=<(Daily, 0), (Brief, 1), (Weekly, 2), (Daily-In-Brief, 3), (Monthly, 4), (Bit, 10), (Icon, 10), (Annual, 10)>

The list L of course may be sorted in a different order, for example in a descending order of priority index values.

It is assumed that the above representations can all be presented or displayed in the visual modality. While all of the alternative representations for a calendar described above lie in the visual modality, they do not all consume the same display or presentation resources. For example, the amount of screen real estate (e.g., window size) required for each representation may be different. When the screen is mostly empty it probably will not matter much which representation(s) are chosen for the calendar. However, when numerous windows are open on the screen, then one of the alternatives having smaller size will normally be more preferable. To effectively reduce display clutter and improve the overall usability of any particular modality and representation, the system may need a built-in mechanism for tracking and quantifying the amount of screen real estate currently consumed (which is one of the display or presentation resources required for rendering). To support this functionality, the list L given above is expanded again, so that its entries are now triples whose third component measures the relative sizes of the various representations as follows:

L=<(Daily, 0, Area=Large), (Brief, 1, Area=Medium), (Weekly, 2, Area=Large), (Daily-In-Brief, 3, Area=Medium), (Monthly, 4, Area=Large), (Bit, 10, Area-Small), (Icon, 10, Area=Small), (Annual, 10, Area=Large)>

For a given family of representations, the concept and idea described above can be extended to include other important measures of display or presentation resources consumed for each representation. The result is that the entries in the list L are no longer triples but rather quadruples as shown below:

L=<Representation name, priority index, modality 1, modality 2> where the last two components (modality 1 and modality 2) are themselves lists whose entries are of the form:

Resource=amount consumed.

In the above example, the modality 1 notation refers to a list of various types of resources consumed or required for rendering the respective representation in modality 1. The modality 2 notation is used to refer to a list of various types of resources consumed or required for rendering the respective representation in modality 2. In the present example, the modality 1 corresponds to visual modality and the modality 2 corresponds to aural modality.

The type of resources in the corresponding modalities is a cognitively relevant feature for rendering representation such as: area, position, duration, color, frequency, etc.

To illustrate the usage of visual and aural modalities, suppose now that the calendar application wants to alert the user as the next appointment draws near. This can be achieved by various means as follows:

Use of animation on screen using one of above 8 representations.

Use of sound: either through an earcon or voice output. The voice can announce a detail appointment while the earcon can herald an impending meeting.

Based upon the description and explanation provided above, a high-quality multimodal and multi-representational calendar application will be expected to make the following decisions on its own:

Which representations should be used in accordance with the current display context.

Where they should be located on the screen.

What type of modalities should be employed? Visual? Voice? Earcon? Or combination?

The following discussion is focused on expanding the ideas and concepts described above with respect to the calendar application example to more generalized cases in which preferable or desirable combination(s) of representations and modalities can be selected for presenting information to the users based upon their preferences of representations and/or modalities and whether available resources are sufficient to accommodate such combinations.

Well-established theory shows that for a given application domain (e.g., the calendar application, etc.) about half a dozen parameters suffice to quantify the cognitively relevant features for rendering a corresponding representation in each output modality. The parameters which are used to quantify the rendering of the corresponding representation for the visual and aural output modalities may be denoted as follows:

$$\{V_i\} i<N_v; \{a_i\} i<N_a \ (N_v, N_a \approx 6)$$

where V and a are used to denote the visual and aural modalities, respectively. For example, using one of the calendar representations described above, some of the relevant parameters in the visual modality may include the area or size of the display, the position of the display, etc. According to the teachings of the present invention, the users are allowed to configure or modify the parameters based upon their preferences to further refine the relevant rendering features associated with each representation. The user's preferences with respect to the various representations and associated parameters may be stored in a database (also referred to as the user preference database herein). For example, the user preference database may be used to store the user specified priority index (preference index) for each representation and also the user specified parameters associated with each representation.

Thus, the family of all possible presentations or displays for a given application domain exists within the 6-spaces whose coordinate axes are the $V_i$ and $a_i$.

In one embodiment, each representation in a given application domain can be described as a frame or semantic frame in a semantic network (also called the display or presentation semantic network herein). Accordingly, the display semantic network can be degenerated to a linear list of frames, each of which contains a finite sequence of quadruples slots. For a given semantic frame S having a representation K, the degenerated linear list $L_S^K$ may be denoted as follows:

$$L_S^K = \langle E_S^K(\hat{t}), P_S^K, V_S^K, A_S^K, \rangle (K \geq 0)$$

where:
- $E_S^K$ is the application-defined handler, which is executed to generate the required representative (s), and $\hat{t}$ is the relative elapsed time from the moment when the application issued this presentation or display request.
- $P_S^K$ is a priority index, which either comes from the application preset or from the user preferences database. As described above, the linear list $L_S^K$ may be sorted in an increasing or ascending order in accordance with $P_S^K$. Hence, $E_S^0$ is the preferred rendering representative among all possible alternatives or representations in $L_S^K$
- $V_S^K$ and $A_S^K$ represent resource consumption estimation or requirements for the corresponding representation with respect to the visual and aural modalities, respectively, as follows:

$$V_S^K = \{Vi(S,K,\hat{t})\} i < Na$$

$$A_K^S = \{ai(S,K,\hat{t})\} i < Na$$

Thus, the above functions indicate the estimated total resources consumed or required by the corresponding display or presentation request.

In one embodiment, it is useful to normalize the resource consumption estimations so that they will be in a range of [0,1]. In one embodiment, a value of 1 denotes "saturation" of the corresponding resource, while a value of 0 indicates that there is no noticeable display effect concerning the corresponding resource.

In one embodiment, a list of all rendering representatives currently on display or being presented is maintained to track the amount of resources that are currently being consumed and the amount of resources that are still available to accommodate new presentation or display requests. In one embodiment, the list of rendering representatives is maintained as a database referred to as the most-recently updated ("touched") display database D(t) herein. The entries in D(t) are the rendering representatives each of which is denoted as follows:

$$Rep_j = \langle Address, content, t_j, S_{pj}, K_j, Op \rangle (j \geq 0)$$

where:
- the address contains the positioning information. Typical examples are: Host(TCP(port)), Audio(channel), Telephony(phone number), Window(pos);
- $t_j$ corresponds to the time or moment when the corresponding rendering representative commenced. Hence, if $t=t_j$ then $\hat{t}=0$.
- $S_{pj}$ is a pointer to a corresponding frame in the display semantic network S
- Op is an operator which includes to types of operations: Add, Delete Based upon the above description, in order to determine which combination(s) of representations and modalities to be used in a given situation, one of the factors or criteria that need to be considered is whether there are sufficient available resources to accommodate a candidate combination of representation and modality. Therefore, given D(t) at a moment t, the task is to determine D(t+1) when the command is <Address, content, $t_j$, $S_{pj}$, $K_j$, Op>. The "Delete" operation is straight forward since there is no potential conflict with any rendering representative currently on display. The more difficult questions is how to deal with the "Add" operation when the command is <Address, content, $t_j$, $S_{pj}$, $K_j$, Add>.

As described above, for a given application domain, there can be multiple representations in which information can be presented to the user. Each representation K has a corresponding priority index or preference score that can be preset by the application and changed by the user. In the present discussion, a lower priority index corresponds to a higher degree of preference. Hence, a representation K having a priority index of 0 is considered most preferable if it can be accommodated given the amount of resources available and the amount of resources required to present the respective representation. Accordingly, the representation which has the lowest priority index (which is most preferable) should be considered first and the representation which has the highest priority index (which is least preferable) should be considered last. In other words, the system should attempt to use the more preferable representation if it is possible to do so.

Based upon the representation selection strategy discussed above, the system will attempt to determine whether the most preferable representation (or the most preferable combination of representation and modality) can be accommodated as follows:

Using:

$$D(t') \leftarrow D(t) + \langle Address, content, t, S_{pj}, 0, Add \rangle$$

and let:

$$Vi \leftarrow \Sigma_j vi(S_{pj}, k_j, 0)$$

$$Ai \leftarrow \Sigma_j ai(S_{pj}, k_j, 0)$$

If there is no accepted rendering representative produced through the above iteration (which means that the most preferable representation cannot be accommodated due to insufficient resources), the process continues as follows:

1. Beginning with the next frame in the given S, start reiteration until an acceptable solution is found (meaning that the current total resource consumption is within the range [0,1]). As described above, since the frames corresponding to the multiple representations are sorted in an order corresponding to the degree of preference (e.g., sorted by priority index), the various representations will be considered in the order of preferences (e.g., more preferable representations are considered or examined before less preferable representations)
2. If there is still no solution resulted in step 1, then determine whether the least recently-touched rendering representative in D(t) could be declined.
3. If step 2 fails, then either:
   A. Notify the user of the presentation or display overload (insufficient resources to accommodate the new presentation or display request); or
   B. Repeat step 2.

Figure 2:
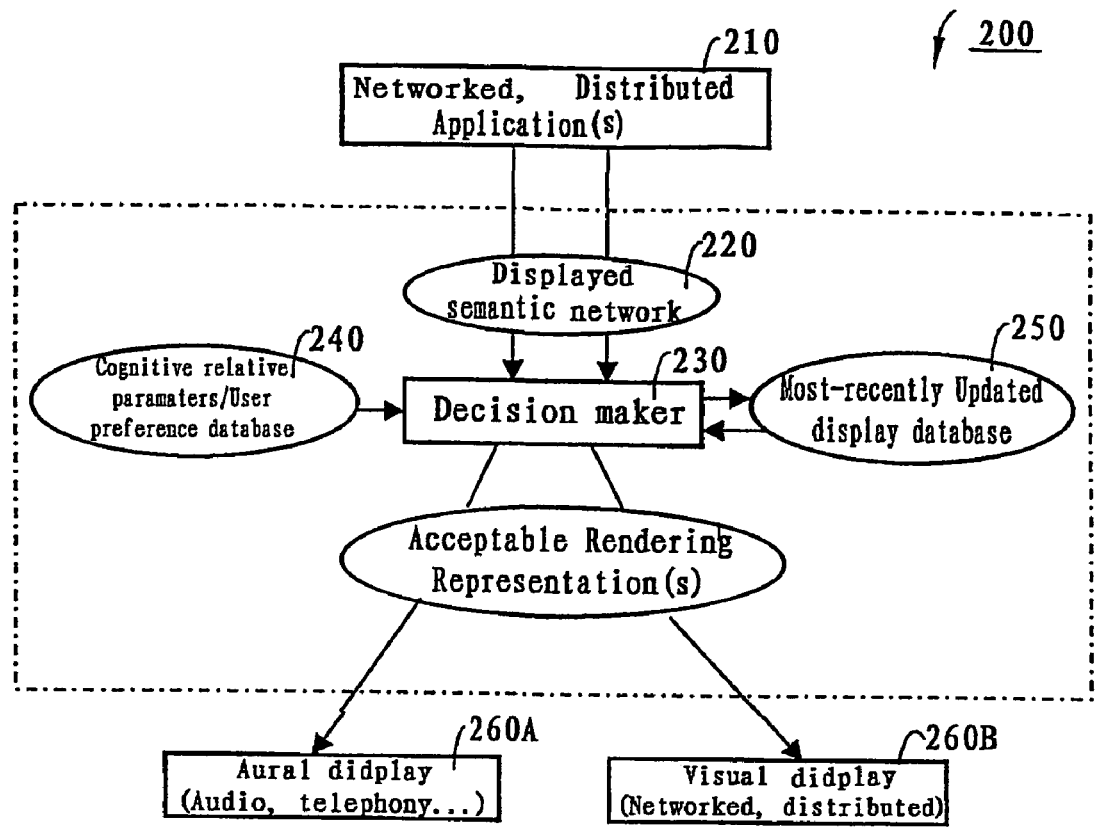
FIG. 2 is a block diagram of one embodiment of a system according to the teachings of the present invention.

FIG. 2 illustrates a block diagram of one embodiment of a system configuration 200 according to the teachings of the present invention. The system 200, as shown in FIG. 2, includes one or more applications 210, a presentation or display semantic network 220, a decision maker or decision making unit 230, a first database 240, a second database 250, and a plurality of output modalities 260. The one or more applications 210 can be networked and/or distributed applications. The first database 240, in one embodiment, is used to store the user preferences with respect to the multiple representations in which information from a particular application domain can be presented to the user. As described above, the user may indicate his relative preferences for the various representations by specifying or changing a priority index (also called preference index or preference score) for each representation associated with a given application domain. In one embodiment, the first database 240 is also used to stored the cognitive relative parameters that are used to quantify the relevant rendering features associated with a given representation. For example, considering the calendar example described above, some of the parameters associated with a daily representation of a calendar may include the size of the display area or window (e.g., large, medium, small, etc.), the position of the display area or window (e.g., center, top, bottom, etc.). The display semantic network 220 contains one or more linear list of frames each of which corresponds to a particular representation in a given application domain and has a finite sequence of quadruple slots as described in detail above. The second database 250 (also called the most-recently updated display database) is used to store a list of all rendering representatives currently on display or being presented at any moment in time. In response to a display or presentation request issued by one of the applications, the decision unit 230 will attempt to select a most suitable or most preferable combination of representation and modality for the presentation request based upon a set of criteria including the user representational and/or modal preferences and the amount of resources available. In one embodiment, starting with the combination of representation and modality that is considered most preferable (e.g., the representation having the lowest priority index), the decision making unit 230 will determine whether available resources are sufficient for a particular combination of representation and modality until available resources are sufficient to accommodate at least one combination of representation and modality or until all combinations have been exhausted. As described above, the decision making unit 230 uses the list of rendering representatives maintained in the second database 250 to determine whether available resources are sufficient for any particular combination of representation and modality, based upon the amount of resources currently in use and the amount of resources required for the rendering of the particular combination being considered. In one embodiment, as described above, in the event that there are not sufficient resources for any combination of representation and modality, the decision unit 230 may determine whether the least recently touched rendering representative can be declined to free up resources. If not, the decision unit 230 may notify the user of the display overload (i.e., available resources are not sufficient to accommodate the presentation or display request) or alternatively, may continue to check whether the least recently touched rendering representative could be declined.

Figure 3:
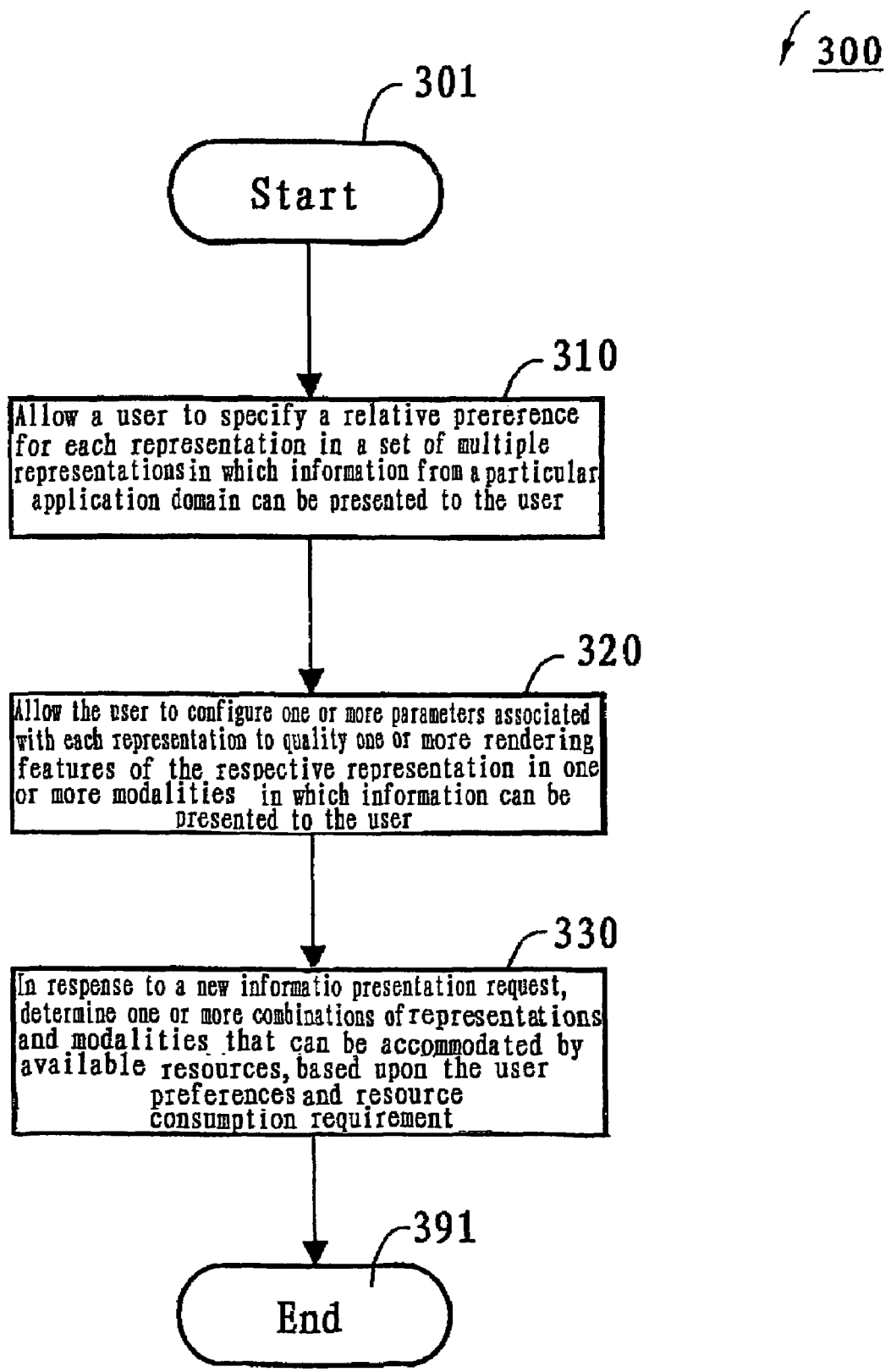
FIG. 3 is a flow diagram of one embodiment of a method according to teachings of the present invention.

FIG. 3 shows a flow diagram of one embodiment of a method 300 according to the teaching of the present invention. At block 310, a user in a system is allowed to specify a relative preference for each representation in a set of multiple representations in which information from a particular application domain can be presented to the user. At block 330, the user is also allowed to configure one or more parameters associated with each representation to quantify one or more rendering features of the respective representation in one or more modalities in which information from the particular application domain can be presented to the user. At block 330, in response to a new information presentation request, one or more combinations of representations and modalities are selected for the presentation request that can be accommodated by available resources, based upon the user preferences and resource consumption requirements.

The invention has been described in conjunction with the preferred embodiment. It is evident that numerous alternatives, modifications, variations and uses will be apparent to those skilled in the art in light of the foregoing description.

What is claimed is:

1. A method comprising:
   receiving input from a user specifying a relative preference for each representation in a set of representations in which information generated from an application domain can be presented to the user;
   receiving input from the user to configure for each representation one or more parameters associated with one more modalities of the each representation;
   in response to a new information presentation request to present information to the user, determining one or more combinations of representations and modalities that can be accommodated by available presentation resources in presenting the information to the user, each combination according to one or more of the configured parameters the determining based upon one or more of the received inputs and an estimation of presentation resources consumed in presenting the information to the user, wherein determining the one or more combinations includes determining whether available presentation resources are sufficient for a particular combination of representation and modality, starting with the representation considered most preferable by the user until available presentation resources are sufficient to accommodate at least one combination of representation and modality or until all combinations have been exhausted;
   if available presentation resources are not sufficient for any combination of representation and modality, determining whether a least recently updated rendering representative can be declined to free up presentation resources for the new presentation request; and
   performing a first action if the least recently updated rendering representative cannot be declined.

2. The method of claim 1 wherein performing the first action comprises:
   notifying the user of a failure to accommodate the new presentation request due to insufficient presentation resources if the least recently updated rendering representative cannot be declined.

3. The method of claim 1 wherein performing the first action comprises:
   continuing to check whether the least recently updated rendering representative can be declined.

4. A system comprising:
   logic to receive input from a user in the system specifying a relative preference for each representation in a set of representations in which information generated from an application domain can be presented to the user;
   logic to receive input from the user to configure for each representation one or more parameters associated with one more modalities of the each representation;
   logic to determine, in response to a new information presentation request from the application, one or more combinations of representations and modalities that can be accommodated by available presentation resources, each combination according to one or more of the configured parameters, the determining based upon one or more of the received inputs and an estimation of presentation resources consumed in presenting the information to the user a database to store a list of rendering representatives, each rendering representative corresponding to a previously executed presentation request, the list of rendering representatives being used to determine the amount of available presentation resources in each modality;

logic communicatively coupled to the database to maintain the list of rendering representatives;

logic to maintain a list of rendering representatives, each rendering representative corresponding to a previously executed presentation request, the list of rendering representatives being used to determine the amount of available presentation resources in each modality;

logic to determine whether a least recently updated rendering representative can be declined to free up presentation resources for the new presentation request if available presentation resources are not sufficient for any combination of representation and modality; and logic to perform a first action if the least recently updated rendering representative cannot be declined.

5. The system of claim 4 wherein logic to perform the first action comprises:

logic to notify the user of a failure to accommodate the new presentation request due to insufficient presentation resources if the least recently updated rendering representative cannot be declined.

6. The system of claim 4 wherein logic to perform the first action comprises:

logic to continue checking whether the least recently updated rendering representative can be declined.

* * * * *